United States Patent
Diab et al.

(10) Patent No.: US 9,065,673 B2
(45) Date of Patent: Jun. 23, 2015

(54) METHOD AND SYSTEM FOR A CENTRALIZED VEHICULAR ELECTRONICS SYSTEM UTILIZING ETHERNET WITH AUDIO VIDEO BRIDGING

(75) Inventors: Wael William Diab, San Francisco, CA (US); Michael Johas Teener, Santa Cruz, CA (US); Yongbum Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1123 days.

(21) Appl. No.: 12/196,120

(22) Filed: Aug. 21, 2008

(65) Prior Publication Data

US 2009/0158360 A1   Jun. 18, 2009

Related U.S. Application Data

(60) Provisional application No. 61/014,342, filed on Dec. 17, 2007.

(51) Int. Cl.
*H04L 12/911* (2013.01)
*H04L 29/08* (2006.01)
*H04L 12/40* (2006.01)

(52) U.S. Cl.
CPC .............. *H04L 12/40* (2013.01); *H04L 47/821* (2013.01); *H04L 67/1014* (2013.01); *H04L 47/70* (2013.01); *H04L 12/40182* (2013.01); *H04L 2012/40273* (2013.01)

(58) Field of Classification Search
CPC ... H04L 49/25; H04L 47/821; H04L 12/4625; H04L 67/1014; H04L 47/70
USPC .......................................... 725/74, 75, 76, 95
See application file for complete search history.

(56) References Cited

U.S. PATENT DOCUMENTS 7,146,260 B2 * 12/2006 Preston et al. ................... 701/24
7,362,777 B2 * 4/2008 Fisher et al. ................... 370/473

(Continued)

FOREIGN PATENT DOCUMENTS

| CN | 1894902 | 1/2007 |
|---|---|---|
| JP | 10329628 | 12/1998 |
| KR | 1020060003392 | 11/2006 |

OTHER PUBLICATIONS

MOSTSpecification 10-2006.pdf, MOST, Media Oriented Systems Transport, MOST Cooperation, Rev. 2.5, Oct. 2006, pp. 14, 19, 173 and 189, http://www.mostcooperation.com/publications/Specifications_Organizational_Procedures/index.html?dir=291.*

(Continued)

*Primary Examiner* — Benjamin R Bruckart
*Assistant Examiner* — Jason Thomas
(74) *Attorney, Agent, or Firm* — Garlick & Markison; Bruce E. Garlick

(57) ABSTRACT

Aspects of a method and system for a centralized vehicular electronics system utilizing Ethernet with audio video bridging are provided. In this regard, electronic devices in a vehicle may be communicatively coupled via one or more Ethernet links and information may be communicated between the electronic devices over the Ethernet link(s) utilizing audio video bridging. At least one of multimedia, control, diagnostic, and sensory information between the electronic devices. Accordingly, resources on the one or more Ethernet links may be reserved via AVB to give priority to one of multimedia, control, diagnostic, and sensory information. Information communicated between the devices may be secured utilizing MACsec and related protocols. The electronic devices may comprise two or more network ports and may be enabled to forward packets between the two or more ports. The Ethernet links may comprise optical and/or copper cabling.

20 Claims, 5 Drawing Sheets

(56) References Cited

U.S. PATENT DOCUMENTS

| | | | |
|---|---|---|---|
| 7,620,825 B2 | 11/2009 | Camagna | |
| 7,620,846 B2 | 11/2009 | Biederman | |
| 2006/0107295 A1* | 5/2006 | Margis et al. | 725/81 |
| 2006/0136715 A1* | 6/2006 | Han et al. | 713/151 |
| 2007/0061846 A1 | 3/2007 | Gollwitzer | |
| 2007/0140187 A1 | 6/2007 | Rokusek et al. | |
| 2007/0199043 A1* | 8/2007 | Morris | 725/143 |
| 2008/0279186 A1* | 11/2008 | Winter et al. | 370/392 |
| 2009/0081947 A1* | 3/2009 | Margis | 455/3.02 |
| 2009/0269062 A1* | 10/2009 | Jestel et al. | 398/59 |

OTHER PUBLICATIONS

60974678 Margis_et_al.pdf, U.S. Appl. No. 60/974,678, filed Sep. 24, 2007.*

European Search Report corresponding to European Patent Application Serial No. 08020897.8-2416, dated Mar. 6, 2009.

Mehrnoush et al., "A Novel Network Architecture for In-Vehicle Audio and Video Communication." Second IEEE/IFIP International Workshop on Broadband Convergence Networks, May 1, 2007.

Daoud et al., "Ethernet-Based Car Control Network." IEEE Canadian Conference on Electrical and Computer Engineering, May 1, 2006.

Daoud et al., "Fault-Tolerant Ethernet-Based Vehicle On-Board Networks." IECON 2006—32nd Annual Conference on IEEE Industrial Electronics, Nov. 1, 2006.

Garner et al., "IEEE 802.1 AVB and Its Application in Carrier-Grade Ethernet [Standards Topics]." IEEE Communications Magazine, vol. 45, No. 12, Dec. 1, 2007.

Kang et al., "Time Synchronization and Resource Reservation for Time-Sensitive Applications in Bridged Local Area Networks." IEEE Sixth International Conference on Advanced Language Processing and Web Information Technology, Aug. 22, 2007.

Garner et al.; IEEE 802.1 AVB and Its Application in Carrier-Grade Ethernet; IEEE Communications Magazine; Dec. 10, 2007; pp. 216-134; vol. 45, Iss 12.

* cited by examiner

METHOD AND SYSTEM FOR A CENTRALIZED VEHICULAR ELECTRONICS SYSTEM UTILIZING ETHERNET WITH AUDIO VIDEO BRIDGING

CROSS-REFERENCE TO RELATED APPLICATIONS/INCORPORATION BY REFERENCE

This patent application makes reference to, claims priority to and claims benefit from U.S. Provisional Patent Application Ser. No. 61/014,342 filed on Dec. 17, 2007.

This application also makes reference to:
U.S. patent application Ser. No. 11/860,264 filed on Sep. 24, 2007; and
U.S. patent application Ser. No. 11/832,807 filed on Aug. 3, 2007.

Each of the above stated provisional applications is hereby incorporated herein by reference in its entirety.

FIELD OF THE INVENTION

Certain embodiments of the invention relate to vehicular electronics. More specifically, certain embodiments of the invention relate to a method and system for a centralized vehicular electronics system utilizing Ethernet with audio video bridging.

BACKGROUND OF THE INVENTION

From staying connected, to assisting with daily tasks, to providing entertainment, electronics are becoming an increasingly important aspect of people's daily lives. Accordingly, vehicles are increasingly being equipped with advanced electronics equipment. For example, advanced stereos and sound systems, navigation equipment, back-up assist cameras, and an increasing number of diagnostic sensors are just some of the advanced electronics being installed in vehicles. Consequently, installation and interoperation of the various electronic components is becoming increasingly complicated and expensive. In this regard, the wiring alone required for communicating data to and from the various electronic devices is a major source of cost and complication in a vehicular electronic system. In this regard, specialized physical media, as is conventionally utilized in the vehicular industry, may be expensive. Additionally, existing standards for vehicular networking, such as MOST and IDB-1394, are immature and largely unproven at high data rates. Additionally, non-standardized devices, connectors, and/or protocols utilized by vehicular electronics networks may further add to the cost and complexity. Thus, conventional and traditional vehicular electronics system may be expensive, complicated, and difficult to upgrade.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a centralized vehicular electronics system utilizing Ethernet with audio video bridging, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a centralized vehicular electronics system utilizing Ethernet with audio video bridging. In various embodiments of the invention, electronic devices in a vehicle may be communicatively coupled via one or more Ethernet links and information may be communicated between the electronic devices over the Ethernet link(s) utilizing audio video bridging. At least one of multimedia, control, diagnostic, and sensory information may be communicated between the electronic devices. Accordingly, resources on the one or more Ethernet links may be reserved via AVB to give priority to one of multimedia, control, diagnostic, and sensory information. Information communicated between the devices may be secured utilizing MACsec and related protocols. Exemplary electronic devices may comprise an optical drive, a digital media player, a terrestrial radio, a display, a speaker, a satellite radio, an audio amplifier, an image capture device, a navigation satellite system, a switch, a bridge, a router, and a diagnostic sensor or monitor. The electronic devices may comprise two or more network ports and may be enabled to forward packets between the two or more ports. There may be one or more redundant paths between the electronic devices. The electronic devices may be enabled to communicate via a plurality of parallel physical channels in said one or more Ethernet links and a data rate on each of the physical channels may be inversely proportion to the number of channels in the plurality. The Ethernet links may comprise optical and/or copper cabling. The information may be encapsulated into one or more Ethernet packets prior to communicating it over the one or more Ethernet links. In this regard, the encapsulated information may be formatted according to HDMI, DisplayPort, and/or MPEG specifications.

Figure 1:
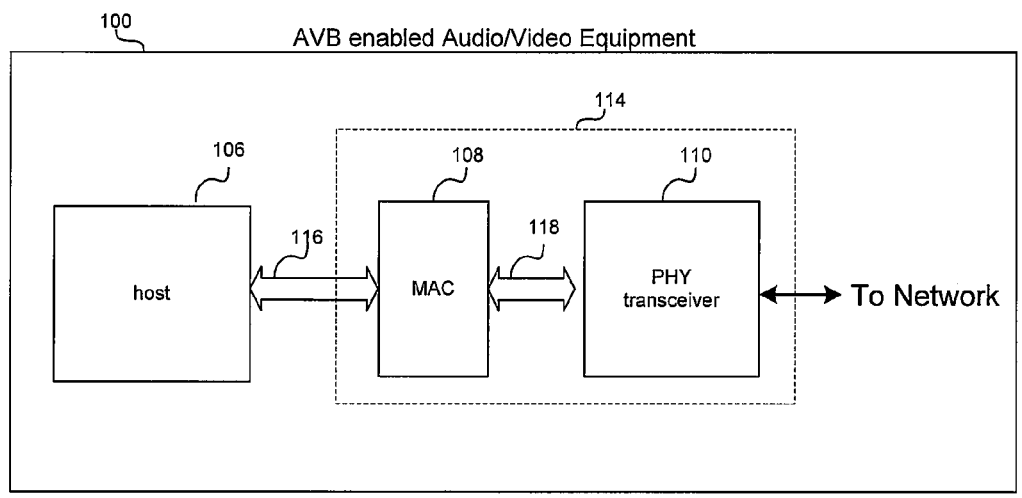
FIG. 1 is a block diagram illustrating exemplary AVB enabled Audio/Video equipment that may transmit and/or receive data over a network, in accordance with an embodiment of the invention.

FIG. 1 is a block diagram illustrating exemplary Audio/Video Bridging and Audio/Video Bridging extensions (any combination of which are referred to herein as Audio Video Bridging or AVB) enabled equipment that may transmit and/or receive data over a network, in accordance with an embodiment of the invention. Referring to FIG. 1, there is shown AVB enabled equipment 100 that comprises a host 106 and a local area networking (LAN) subsystem 114. In various embodiments of the invention, the equipment may comprise a non-mission critical vehicular electronic device such as a stereo, a digital media player, a navigation system, a video camera, a display, a speaker, or another multimedia device. In various embodiments of the invention, the equipment may comprise a mission critical vehicular electronic device such as a central computing system or any of a variety of diagnostic sensors or monitors.

The host 106 may comprise suitable logic, circuitry, and/or code that may enable operability and/or functionality of the five highest functional layers of the OSI model. In this regard, the host may process and/or generate packets that are to be transmitted over a network and process data packets received from a network. In this regard, the host 106 may execute instructions and/or run one or more applications to provide services to a local user and/or to one or more remote users or nodes in a network. In various embodiments of the invention, the host 106 may implement one or more security protocols such as IPsec. In this regard, security protocols may be of particular importance for mission-critical devices.

The LAN subsystem 114 may comprise a medium access control (MAC) module 108 and a PHY 110. In various embodiments of the invention, the LAN subsystem 114 may support a variety of data rates such as 10 Mbps, 100 Mbps, 1000 Mbps (or 1 Gbps), 2.5 Gbps, 4 Gbps, 10 Gbps, or 40 Gbps, for example. In this regard, the PHY device 110 may support standard-based data rates and/or non-standard data rates. Additionally, the LAN subsystem 114 may be operable to perform a diagnostic of the link(s) to which it may be communicatively coupled. In this manner, network problems such as open and shorted links may be detected and the quality of an Ethernet link may be determined.

The MAC module 108 may comprise suitable logic, circuitry, and/or code that may enable handling of data link layer, layer 2, operability and/or functionality in the AVB enabled equipment 100. Accordingly, for egress data, the MAC 108 may receive data from the host 106, append headers or otherwise packetize the data for routing through a network, and convey the data to the PHY 110. Similarly, for ingress data, the MAC 108 may receive bits from the PHY, reassemble the bits into packets and communicate the packets to the host 106. In various embodiments of the invention, the MAC controller 108 may be configured to implement Ethernet protocols, such as those based on the IEEE 802.3 standard, for example. Additionally, the MAC controller 108 may be enabled to implement AVB protocols such as IEEE 801.1Qat and IEEE 802.1Qav. Also, the MAC controller may be enabled to implement security protocols such as IEEE 802.1ae (MACSec) and related protocols such as IEEE 802.1af and IEEE 802.1ar.

The PHY 110 may comprise suitable logic, circuitry, and/ or code that may be operable to transmit and receive physical layer symbols over a physical medium. In this regard, the PHY 110 may receive data from the MAC 108, convert the data to one or more physical layer symbols, and impress the symbol onto the physical medium. Similarly, the PHY 110 may receive physical layer symbols, process the symbols to extract data bits represented by the symbols, and convey the data bits to the MAC 108. In various embodiments of the invention, to support AVB, the PHY 110 may be enabled to generate timestamps corresponding to the transmission and/ or reception of data. In various embodiments of the invention, the PHY 110 may interface with one or more of a variety of physical media such as copper, fiber, and/or backplane. In this regard, due to the ubiquity of Ethernet, cabling or other physical media for an Ethernet network may be less costly and/or easier to obtain than cabling and/or physical media associated with other technologies. In various embodiments of the invention, the transceiver 110a may support standard and/or extended link length and/or range of operation. Exemplary ways in which the PHY 110 may support extended link length are disclosed in U.S. patent application Ser. No. 11/686,867 filed on Mar. 15, 2007 and U.S. patent application Ser. No. 11/686,852 filed on Mar. 15, 2007, each of which is hereby incorporated herein by reference in its entirety. In this regard, although extended range may not be necessary for a vehicular electronics system, methods and systems utilized for extending the range of an Ethernet link may also be utilized to improve electromagnetic emissions and/or susceptibility of an Ethernet link. Reduced electromagnetic emissions and/or susceptibility may be desirable due to relatively high levels of interference that may be found in a vehicular electronics system. In an exemplary embodiment of the invention, data which would conventionally be communicated over 'N' physical channels at a first data F1 rate may be communicated over 'M' physical channels at a rate of F1*(N/M), where M and N are integers greater than or equal to 1.

Figure 2:
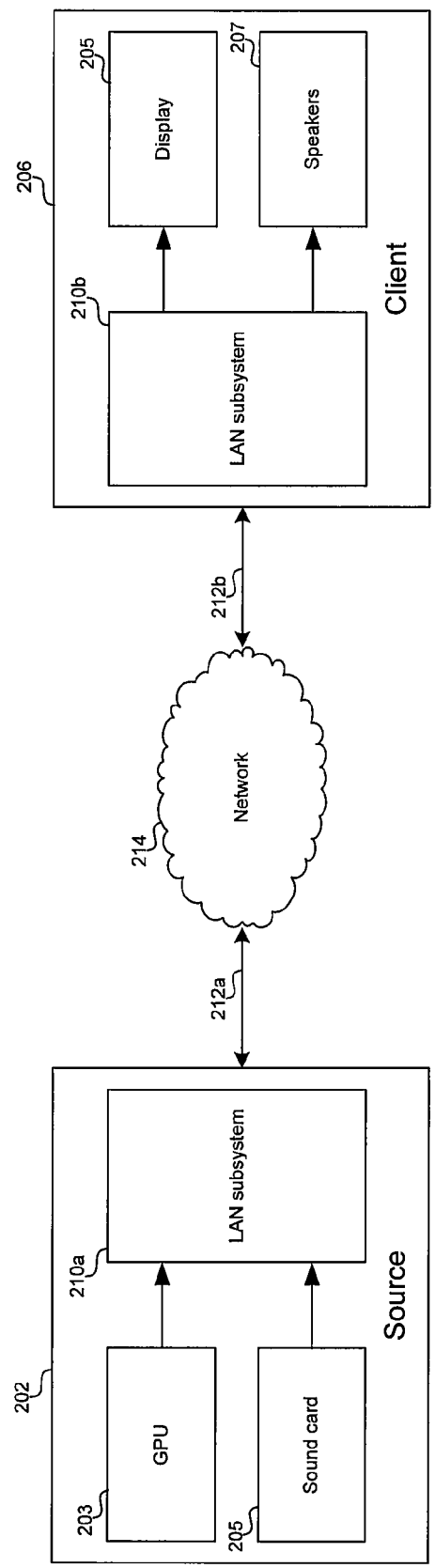
FIG. 2 is a diagram illustrating transmission of data over a network, in accordance with an embodiment of the invention.

FIG. 2 is a diagram illustrating transmission of data over a network, in accordance with an embodiment of the invention. Referring to FIG. 2 there is shown exemplary non-mission critical devices comprising a source 202 and a client 206 which may exchange multimedia traffic via the network 214. Guaranteed quality of service made possible utilizing AVB may enable, for example, synchronizing audio with video while distributing the audio and video to various electronic devices in a vehicle. In this regard, audio or video may be routed to different devices and/or via a different number of devices in a vehicle. Furthermore, AVB may enable transmission of high definition multimedia streams between various components of an automotive electronics system. Additionally, AVB may enable prioritizing data to and/or from one or more electronic devices in a vehicle. For example, a cell phone may be linked to the vehicle electronics network via a Bluetooth link, and music may be paused such that audio from the cell phone may be routed to the speakers during a call.

Mission critical components of a vehicular electronics network may be similar to the source 202 and client 206, but may exchange, for example, diagnostic and or sensor information rather than, for example, multimedia or navigation information. In this regard, guaranteed quality of service made possible utilizing AVB may enable combining mission critical and non-mission critical devices into a single vehicular network rather than having separate networks for mission critical and non-mission critical devices. In this regard, mission critical information such diagnostic sensory data may be given priority in a vehicular network.

The network 214 may comprise one or more physical links and/or network hardware devices. In an exemplary embodiment of the invention the network 210 may comprise one or more Ethernet switches, which may be AVB enabled, and/or comprise one or more unshielded twisted pair cables with 8 position 8 conductor (8P8C) modular connectors on either end. In other embodiments of the invention, the physical links may be fiber optic cables or backplane.

The source 202 may comprise suitable logic circuitry, and/ or code that may enable generating and/or outputting data. In this regard, the source 202 may be enabled to generate and/or process data and communicate that data to a remote client. For example, the source 202 may be a media player, a navigation system, or a video camera and may be similar to, or the same as, the AVB enabled equipment 100 described with respect to FIG. 1. For example, the source 202 may generate and/or output multimedia and may comprise a GPU 203, a sound card 205, and a LAN subsystem 210a. The GPU 203 may comprise suitable logic, circuitry, and/or code that may enable generating graphics and/or video data. In this regard, resolution, encoding, format, compression, encryption, data rates, and/or other characteristics of video and/or graphics out of the GPU 203 may vary without deviating from the scope of the invention. For example, high definition video of 720p, 1080i, 1080p, or even higher resolution may be supported and output by the GPU 203. The sound card 205 may comprise suitable logic, circuitry, and/or code that may enable generating audio data. In this regard, resolution, encoding, format, compression, encryption, data rates, and/or other characteristics of an audio stream out of the sound card 205 may vary without deviating from the scope of the invention. For example, audio sample at 44.1 kHz, 96 kHz, 192 kHz or even higher may be supported and output by the sound card 205. The LAN subsystem 210a may comprise suitable logic, circuitry, and/or code that may enable transmitting and/or receiving data, which may be multimedia and/or time sensitive data, over a network. The LAN subsystem 210a may be enabled to utilize AVB. The LAN subsystem 210 may utilize Ethernet protocols for transmitting and/or receiving data into the network 210. Additionally, the LAN subsystem may be enabled to encrypt, decrypt, format, encode, packetize, compress, decompress, or otherwise process multimedia data.

The client 206 may comprise suitable logic circuitry, and/or code that may enable rendering and/or presenting data. For example, the client 206 may be a central computing module that may receive and process diagnostic information from one or mores sensors to control one or more functions of systems of a vehicle. Alternatively, the client 206 may be a multimedia device enabled to receive audio and/or video and process the received data for presentation to an occupant of the vehicle. For example, the client 206 may comprise a display 205, one or more speakers 207, and a LAN subsystem 210b. The display 205 may comprise suitable logic, circuitry, and/or code that may enable receiving video data and presenting it to a user. In this regard, the display 205 may be enabled to render, format, decompress, decrypt, or otherwise process video and/or graphics for presentation to a user. The speaker(s) 207 may comprise suitable logic, circuitry, and/or code that may enable receiving audio data and presenting it to a user. In this regard, the speaker(s) 207 may be enabled to render, format, decompress, decrypt or otherwise process the audio for presentation to a user. The LAN subsystem 210b may comprise suitable logic, circuitry, and/or code that may enable transmitting and/or receiving data over a network. The LAN subsystem 210a may be enabled to utilize AVB. The LAN subsystem 210 may utilize Ethernet protocols for transmitting and/or receiving data to/from the network 210. Additionally, the LAN subsystem may be enabled to format, encode, packetize, compress, decompress, encrypt, decrypt, or otherwise process multimedia data.

In operation, the GPU 203 may generate video and/or graphics and may transfer the video and/or graphics to the LAN subsystem 210a for additional processing, formatting, and/or packetization according to one or more standards. In various embodiments of the invention, the GPU 203 may output raw video and/or graphics or may output video and/or graphics formatted according to, for example, DisplayPort or HDMI, standards. Additionally, the sound card 205 may generate audio and may transfer the audio to the LAN subsystem 210a for additional processing, formatting, and/or packetization according to one or more standards. In various embodiments of the invention, the sound card 205 may output uncompressed audio or may output audio formatted according to, for example, Mp3 or AAC, standards. The LAN subsystem 210a may encapsulate the multimedia data received from the GPU 203 and the sound card 205 into Ethernet frames and transmit the frames into the network 214 via the physical link 212a. The LAN subsystem 210b may receive the multimedia data over the network 214 via the physical link 212b. The LAN subsystem 210b may de-packetize, parse, format, decrypt, and/or otherwise process the received data and may convey received video data to the display 205 and may convey received audio data to the speaker(s) 207. In this regard, data formatted according to, for example, HDMI, DisplayPort, USB, or IEEE 1394 standards may be tunneled over an Ethernet link between vehicular electronic devices. In an exemplary embodiment of the invention, the LAN subsystem 210a may, for example, receive Ethernet frames and extract and/or reconstruct DP "micro-packets" from received Ethernet frames. The LAN subsystem 210b may convey the "micro-packets" to the display 205 and/or the speaker(s) 207. In an exemplary embodiment of the invention, the LAN subsystem 210b may extract the audio and/or video data from the micro-packets and convey raw video to the display 205 and raw audio to the speaker(s) 207.

In various embodiments of the invention, the source 202 and the client 206 may implement one or more protocols for what may be referred to as "Energy Efficient Ethernet". For example, low-power IDLE signaling, subset PHY, and/or dynamic control of a data rate at which the source 202 and the client 206 may communicate over the links 212.

Figure 3:
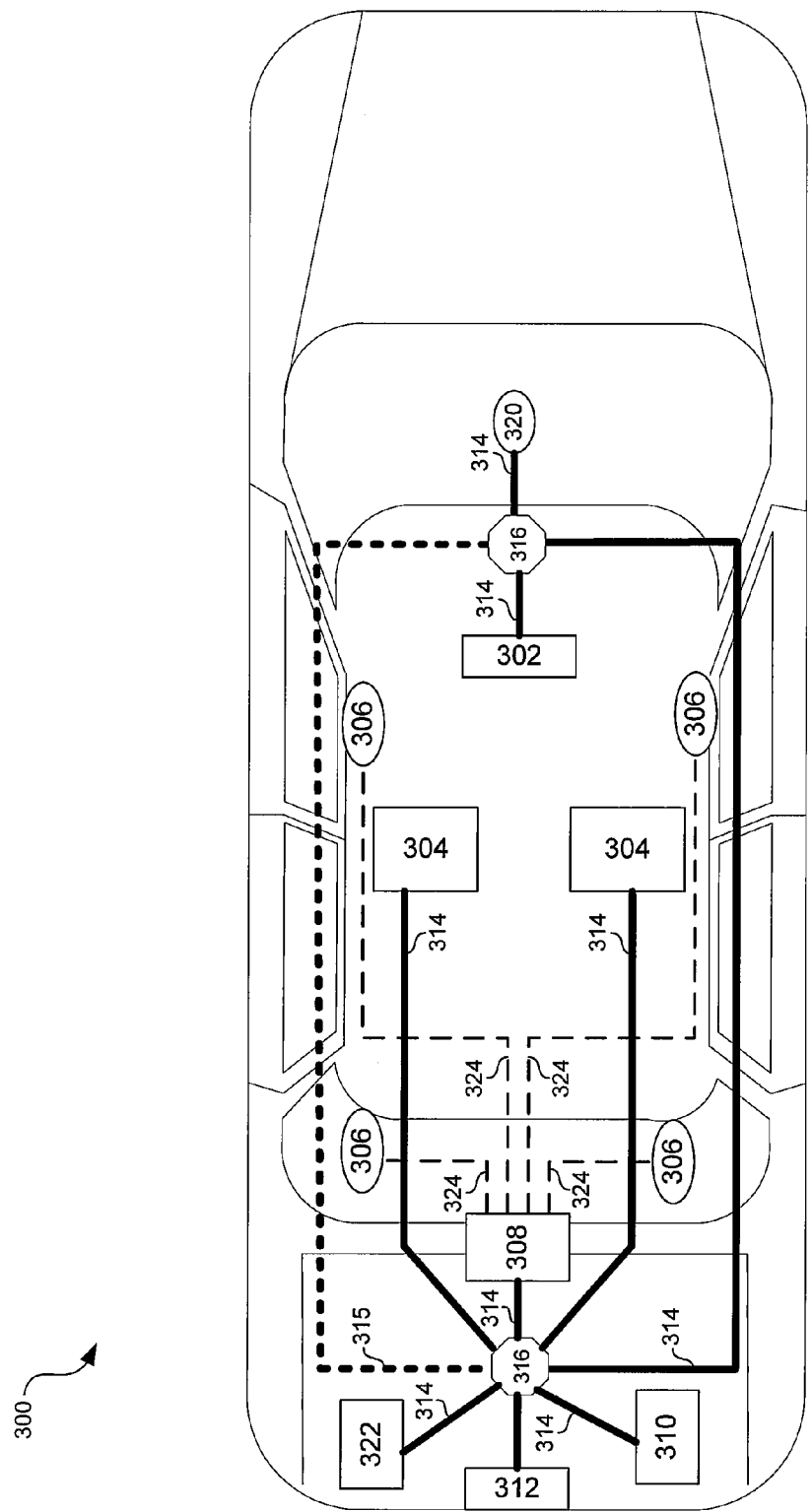
FIG. 3 is a diagram illustrating an exemplary vehicular electronics network, in accordance with an embodiment of the invention.

FIG. 3 is a diagram illustrating an exemplary vehicular electronics network, in accordance with an embodiment of the invention. Referring to FIG. 3, the exemplary vehicular electronics network 300 may comprise entertainment and/or navigation (NAV) equipment 302, displays 304, speakers 306, audio equipment 308, computing device 310, back-up assist camera 312, microphone 320, and entertainment equipment 322. Each of the entertainment and/or navigation system 302, displays 304, audio equipment 308, computing device 310, back-up assist camera 312, microphone 320, and entertainment equipment 322 may be similar to, or the same as, the AVB enabled equipment 100, the source 202, and/or the client 206. In this regard, the electronic components may be enabled to communicate data, including but not limited to HD multimedia streams, over the Ethernet links 314, and possibly one or more redundant links 315, utilizing Ethernet with Audio Video Bridging Protocols and/or extensions thereto. Various embodiments of the invention may comprise additional, different, and/or fewer electronic components without deviating from the scope of the invention.

In some embodiments of the invention, the Ethernet links 314 and/or 315 may comprise optical fibers. In some embodiments of the invention, the Ethernet links 314, 315, and/or the speaker wires 324 may comprise Cat-5 (or similar) cabling and the speaker wires 324 may comprise conventional speaker wire and/or Cat-5 (or similar) cabling. In other embodiments of the invention, the Ethernet links 314 and/or 315 may comprise cabling and/or connectors that may not be conventionally utilized for Ethernet but may suitable and/or desirable for a vehicular electronic network. For example, the links 314 and/or 315 may comprise cabling similar to Cat-5 cabling but with fewer than four twisted pairs to reduce cost and/or weight.

The entertainment and/or navigation equipment 302 may comprise suitable logic, circuitry, and/or code operable to receive, distribute, and/or control multimedia and/or navigation information. The entertainment and/or navigation equipment 302 may comprise a control center for vehicle occupants to interact with the network 300. In this regard, the entertainment and/or navigation equipment 302 may enable controlling audio and/or video presented via various components of the network 300. Accordingly, the entertainment and/or navigation equipment 302 may transmit and receive data and/or control information, in Ethernet frames, to/from one or more components of the network 300 via the links 314 and/or 315. In various embodiments of the invention, the entertainment and/or navigation equipment 302 may be enabled to communicate with additional electronic devices via a wireless protocol such as Wi-Fi, Bluetooth, and/or wireless USB.

The displays 304 may comprise suitable logic, circuitry, and/or code for presenting multimedia data. In some embodiments of the invention, Ethernet frames comprising the multimedia data may be conveyed to the display equipment 304 utilizing AVB via the Ethernet links 314. In some embodiments of the invention, raw audio and/or video may be communicated to the displays 304 via one or more twisted pairs comprising the Ethernet links 314. Additionally, the displays 304 may comprise one or more input devices, such as a touch screen, for a user to interact with one or more devices in the network 300. In this regard, control data may be communicated to and/or from the displays 304 via one or more links 314 and/or 315.

The speakers 306 may comprise suitable logic, circuitry, and/or code for converting audio data to acoustic waves. In some embodiments of the invention, analog audio signal may be conveyed to the speakers 306 via conventional speaker wire or via twisted pairs in a Cat-5 (or similar) cable. In some embodiments of the invention, audio data encapsulated in one or more Ethernet frames may be conveyed to the speakers 306 and the speakers 306 may be operable to convert the digital audio data to analog audio before converting the analog audio to acoustic waves.

The audio equipment 308 may comprise suitable logic, circuitry, and/or code for extracting audio from Ethernet frames and generating corresponding analog audio signals to be conveyed via the links 324. For example, the audio equipment may be an amplifier and/or cross-over. In various embodiments of the invention, the links 324 may comprise conventional speaker wire or may comprise cabling typically found in Ethernet networks, such as Cat-5 cabling. In other embodiments of the invention, the audio equipment 308 may digitally process the audio and re-encapsulate the audio data into Ethernet frames prior for communication to the speakers 306.

The computing device 310 may comprise suitable logic, circuitry, and/or code for collecting information from one or more sensors and communicating that information over an Ethernet link 314. In this regard, data or information from sensors may be displayed visually or aurally to a driver or passenger via the network 300. Additionally, data collected by the computing device 310 may be utilized to control various portions of the vehicular electronics network 300 and/or various functions of the vehicle.

The back-up assist camera 312 may comprise suitable logic, circuitry, and/or code that may be operable to capture images and convey those images to a display. In this regard, back-up assist camera 312 may encapsulate the captured image data into Ethernet frames and convey them, utilizing AVB, to the entertainment and/or navigation equipment 302 for viewing by the driver of the vehicle.

The microphone 320 may comprise suitable logic, circuitry, and/or code that may be operable to convert acoustic waves into digital audio data. Audio from the microphone 320 may enable a user (driver or passenger) to control various functions of the vehicular electronics network 300 via voice commands. Additionally, the microphone 320 may enable interaction, via Bluetooth or Wi-Fi for example, with a cell phone or other portable electronic device via the vehicular electronics network 300.

The entertainment equipment 322 may comprise suitable logic, circuitry, and/or code for outputting multimedia. In this regard, the entertainment equipment 322 may encapsulate audio and/or video into Ethernet frames and communicate the frames utilizing AVB to various portions of the network 300. In this regard, the multimedia may, for example, be played back from an optical disc or digital storage medium. In some embodiments of the invention, entertainment equipment 322 may be a video game console. Control information may be communicated utilizing AVB over to the entertainment equipment 308 from one or more other components of the network 300. In this regard, the entertainment equipment 308 may be controlled to, for example, select a desired disc, track, or file to be played back.

In the exemplary vehicular electronics network 300, the various devices may each comprise a single Ethernet port and may be communicatively coupled in a star-topology, via the nodes 316. In this regard, the nodes 316 may be similar to the AVB enabled equipment 100 described with respect to FIG. 1. The nodes 316 may be hubs, switches, bridges, or similar devices enabled to communicatively couple a plurality of AVB enabled network nodes via a corresponding plurality of links 314. The nodes 316 may be operable to perform higher layer (e.g., layer 3 and/or layer for of the OSI model) functions or protocols which may utilize, or run on top of, layer 2 Audio Video Bridging protocols. The nodes 316 may simplify the installation and wiring of the various electronic components by providing a ubiquitous Ethernet interface. Moreover, the amount and complexity of wiring may be reduced since each device may only need to be coupled to a node 316 rather than having to run all wires or cables to, for example, the entertainment and/or navigation system 302. Furthermore, the nodes 316 may provide additional and/or spare ports for reconfiguring, upgrading, and/or adding components to the vehicular electronics network 300.

In operation, the nodes 316 may route multimedia and control data, encapsulated in Ethernet packets, between the electronic devices 302, 304, 308, 310, 312, 320 and 322. AVB may be utilized to ensure quality of service for the communicated data. Connecting and disconnecting equipment to the vehicular electronics network 300 may be, for example, "plug and play" similar to or the same as a computer connecting to a conventional local area network. In this regard, an occupant of the vehicle may connect a portable or external electronic device to the vehicular electronics network 300. For example, an occupant of the vehicle may connect a laptop comprising a standard Ethernet port to the vehicular electronics network 300. In this manner, media from the laptop may be presented via, for example, the speakers 206 and the displays 304. Similarly, the laptop may be enabled to download, diagnostic, sensory, and/or recent trip data from the vehicular electronics network 300 without a need for specialized hardware or connectors. Accordingly, aspects of the invention may provide a standardized, ubiquitous, easily installed, easily maintained, and easily upgradeable vehicular electronics system.

In various embodiments of the invention, one or more redundant network links, such as the link 315 depicted as a dashed line in FIG. 3, may be present in the vehicular electronics network. In various embodiments of the invention, loops in the network may be normally blocked as a result of a spanning tree algorithm but may be utilized in the event of a network failure. Alternatively, redundant paths may be utilized to increase throughput between two or more nodes in a network.

Figure 4:
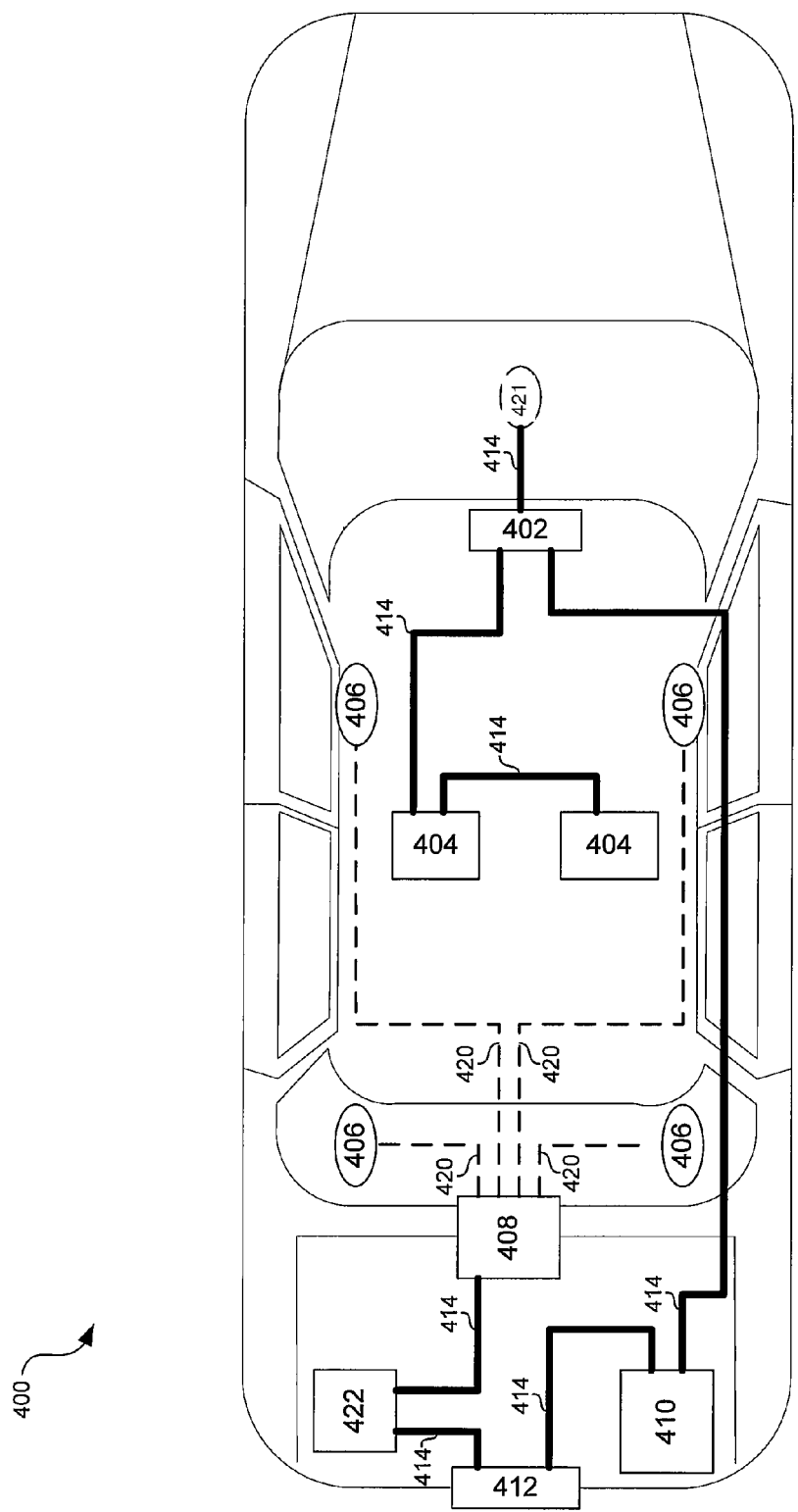
FIG. 4 is a diagram illustrating another exemplary vehicular electronics network, in accordance with an embodiment of the invention.

FIG. 4 is a diagram illustrating another exemplary vehicular electronics network, in accordance with an embodiment of the invention. Referring to FIG. 4, the network 400 may be similar to the network 300 and may comprise entertainment and/or navigation (NAV) equipment 402, displays 404, speakers 406, audio equipment 408, computing device 410, back-up assist camera 412, microphone 421, and entertainment equipment 422. In this regard, the various components of the network 400 may be similar to the components of the network 300 but each may comprise one or more additional network ports and associated circuitry, logic, and/or code. In this regard, one or more of the devices of the network 400 may be operable to forward packets between two or more ports. In this manner, rather than the star topology of network 300, the components of the network 400 may be daisy chained. In this regard, the networks 300 and 400 are only exemplary and other vehicular networks may utilize a combination of star-coupled and daisy chained devices. Additionally, one or more redundant links for providing fail over operation or for increasing throughput, similar to the link 315 of FIG. 3, may be present in a vehicular electronics network utilizing any combination of star-coupled and daisy-chained devices.

Figure 5:
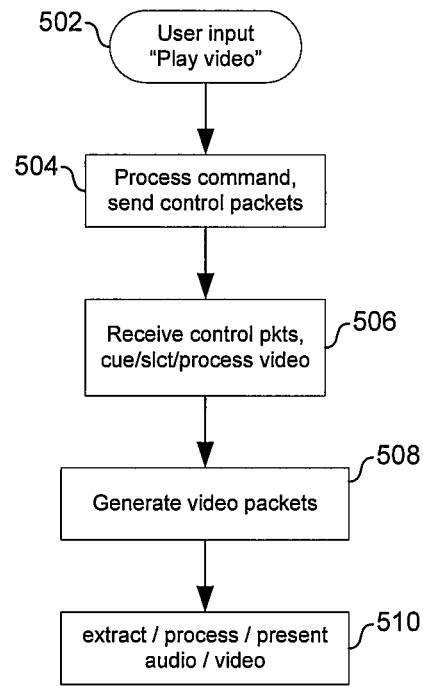
FIG. 5 is a flow chart illustrating exemplary steps for communicating multimedia information and/or control information via one or more Ethernet links in a vehicle, in accordance with an embodiment of the invention.

FIG. 5 is a flow chart illustrating exemplary steps for communicating multimedia information and/or control information via one or more Ethernet links in a vehicle, in accordance with an embodiment of the invention. Referring to FIG. 5, the exemplary steps may begin with step 502 when a user desires his vehicular electronics network 300 or 400 to play a video. In this regard, the user may for example, interact with the entertainment and/or navigation system 302 via, for example, an on-screen display or one or more commands spoken into the microphone 320 to initiate playback of a video. Subsequent to step 502, the exemplary steps may advance to step 504.

In step 504, the entertainment and/or navigation system 302 may process the user input and generate control information for controlling the entertainment device 322. In this regard, the entertainment and/or navigation system 302 may generate one or more Ethernet packets comprising control data and may communicate, utilizing AVB, the Ethernet packets to the entertainment device 322. Subsequent to step 504, the exemplary steps may advance to step 506.

In step 506, the entertainment device 322 may receive and parse and/or process the Ethernet packets to determine which video source and/or file to play. For example, the control information may cause the entertainment device 322 may to select an optical disc from a plurality of optical discs or select a video file on a hard-drive for playback. Subsequent to step 506, the exemplary steps may advance to step 508.

In step 508, the computing device 310 may begin reading video and accompanying audio form a source such as an optical disc, hard-drive, or solid state storage, packetize the video and audio data into Ethernet packets, and communicate, utilizing AVB, the Ethernet packets to the audio equipment 308 and the displays 304. Subsequent to step 508, the exemplary steps may advance to step 510.

In step 510, the audio equipment 308 may receive the packets comprising the audio data, may extract and/or reconstruct the audio from the received packets, and output the audio signal(s) to the speakers 306. Exemplary processing of the extracted audio by the audio equipment 308 may comprise signal level adjustment, equalization, color adjustment, decryption, and decompression. In some embodiments of the invention, audio may be re-packetized into Ethernet frames for communication over an Ethernet link to the speakers 306. In some embodiments of the invention, raw audio signals, analog baseband signals, for example, may be communicated over an Ethernet link to the entertainment and/or navigation system 302.

Also in step 510, the displays 304 may receive the packets comprising the video data, may extract and/or reconstruct the video from the received packets, and present the video. Exemplary processing of the extracted video by the displays 304 may comprise the signal level adjustment, equalization, color adjustment, decryption, and decompression. Subsequent to step 510, the exemplary steps may advance to step 512. In some embodiments of the invention, video may be re-packetized into Ethernet frames for communication over an Ethernet link to the displays 304. In some embodiments of the invention, formatted video, such as DisplayPort or HDMI, may be communicated to the displays 304 via one or more physical channels of an Ethernet link Aspects of a method and system for a centralized vehicular electronics system utilizing Ethernet with audio video bridging are provided. In various embodiments of the invention, electronic devices in a vehicle may be communicatively coupled via one or more Ethernet links 314 and/or 315 and information may be communicated between the electronic devices over the Ethernet link(s) 314 and/or 315 utilizing audio video bridging. At least one of multimedia, control, diagnostic, and sensory information may be communicated between the electronic devices. Accordingly, resources on the one or more Ethernet links 314 and/or 315 may be reserved via AVB to give priority to one of, for example, multimedia, control, diagnostic, and sensory information. Information communicated between the devices may be secured utilizing MACsec and related protocols. Exemplary electronic devices may comprise an optical drive (e.g. entertainment equipment 322), a digital media player (e.g. entertainment equipment 322), a terrestrial radio (e.g. equipment 302), a display (e.g. displays 304), a speaker (e.g. speakers 306), a satellite radio (e.g. equipment 302), an audio amplifier (e.g. audio equipment 308), an image capture device (e.g. back-up assist camera 312), a navigation satellite system (e.g. equipment 302), a switch (e.g. nodes 316), a bridge (e.g. nodes 316), a router (e.g. nodes 316), and a diagnostic sensor or monitor (e.g. computing device 310). The electronic devices may comprise two or more network ports and may be enabled to forward packets between the two or more ports. There may be one or more redundant paths 315 between the electronic devices. The electronic devices may be enabled to communicate via a plurality of parallel physical channels in said one or more Ethernet links and a data rate on each of the physical channels may be inversely proportion to the number of channels in the plurality. The Ethernet links may comprise optical and/or copper cabling. The information may be encapsulated into one or more Ethernet packets prior to communicating it over the one or more Ethernet links. In this regard, the encapsulated information may be according to HDMI, DisplayPort, and/or MPEG specifications.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a centralized vehicular electronics system utilizing Ethernet with audio video bridging.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   directly coupling first audio video bridging enabled equipment to each electronic device within a first group of two or more electronic devices in a vehicle via respective first Ethernet links;
   directly coupling second audio video bridging enabled equipment to each electronic device within a second group of two or more electronic devices in the vehicle via respective second Ethernet links;
   coupling said first audio video bridging equipment to said second audio video bridging equipment via one or more third Ethernet links; and
   reserving resources on said one or more third Ethernet links utilizing said first and second audio video bridging equipment to enable information to be communicated between a first electronic device in the first group and a second electronic device in the second group and to give priority to mission critical electronic devices over non-mission critical electronic devices, at least one of said first and second groups including a mission critical electronic device, said mission critical electronic devices transmitting diagnostic information.

2. The method according to claim 1, comprising communicating at least one of multimedia, control, diagnostic, navigation and sensory information between said first electronic device and said second electronic device via said first and second audio video bridging equipment and said first, second and third Ethernet links.

3. The method according to claim 1, comprising securing said information utilizing MACsec.

4. The method according to claim 1, wherein said electronic devices comprise at least one of an optical drive, a digital media player, a terrestrial radio, a display, a speaker, a satellite radio, an audio amplifier, an image capture device, a navigation satellite system, a switch, a bridge, a router, and a diagnostic sensor or monitor.

5. The method according to claim 1, wherein at least one of said electronic devices comprises two or more network ports and is enabled to forward packets between said two or more ports.

6. The method according to claim 1, wherein said one or more third Ethernet links enable one or more redundant paths between said electronic devices in said vehicle.

7. The method according to claim 1, wherein said first and second electronic devices are enabled to communicate via a plurality of parallel physical channels in said one or more third Ethernet links, wherein a data rate on each said physical channel is inversely proportion to the number of said channels in said plurality of physical channels.

8. The method according to claim 1, wherein said first, second and third Ethernet links comprise optical and/or copper cabling.

9. The method according to claim 1, comprising encapsulating said information into one or more Ethernet packets, prior to said communicating via said one or more third Ethernet links.

10. The method according to claim 9, wherein said information is formatted according to HDMI, DisplayPort, and/or MPEG specifications.

11. A system for networking, the system comprising:
    first and second audio/video bridging equipment for use in a vehicular electronics system, each of said first and second audio/video bridging equipment operable to:
       directly couple, via respective first Ethernet links, to each electronic device within a respective group of electronic devices;
       couple, via one or more second Ethernet links, to each other; and
       reserve resources on said one or more second Ethernet links to enable information to be communicated between a first electronic device in a first group and a second electronic device in a second group and to give priority to mission critical electronic devices over non-mission critical electronic devices, at least one of said first and second groups including a mission critical electronic device, said mission critical electronic devices transmitting diagnostic information.

12. The system according to claim 11, wherein said first and second audio/video bridging equipment are operable to communicate at least one of multimedia, control, diagnostic, navigation and sensory information between said first and second electronic devices.

13. The system according to claim 11, wherein said first and second audio/video bridging equipment are operable to secure said information utilizing MACsec.

14. The system according to claim 11, wherein said electronic devices comprise at least one of an optical drive, a digital media player, a terrestrial radio, a display, a speaker, a satellite radio, an audio amplifier, an image capture device, a navigation satellite system, a switch, a bridge, a router, and a diagnostic sensor or monitor.

15. The system according to claim 11, wherein at least one of said electronic devices comprises two or more network ports and is enabled to forward packets between said two or more ports.

16. The system according to claim 11, wherein said one or more second Ethernet links enable one or more redundant paths between said electronic devices in said vehicle.

17. The system according to claim 11, wherein said electronic devices are enabled to communicate via a plurality of parallel physical channels in said one or more second Ethernet links, wherein a data rate on each said physical channel is inversely proportion to the number of said channels in said plurality of physical channels.

18. The system according to claim 11, wherein said first and second Ethernet links comprise optical and/or copper cabling.

19. The system according to claim 11, wherein said first and second audio/video bridging equipment are operable to encapsulate said information into one or more Ethernet packets, prior to said communication of said information via said one or more second Ethernet links.

20. The system according to claim 19, wherein said information is formatted according to HDMI, DisplayPort, and/or MPEG specifications.

* * * * *